Patented Nov. 25, 1930

1,782,401

UNITED STATES PATENT OFFICE

JOSEPH N. BORGLIN, OF KENVIL, NEW JERSEY, ASSIGNOR TO HERCULES POWDER COMPANY, OF WILMINGTON, DELAWARE, A CORPORATION OF DELAWARE

METHOD OF PRODUCING ROSIN OIL

No Drawing. Application filed January 2, 1929, Serial No. 329,966. Renewed March 29, 1930.

My invention relates to an improved method for producing rosin oil. The method in accordance with my invention is applicable to the production of rosin oil from wood rosin and from gum rosin, though it will be found particularly advantageous in the case of wood rosin from which, according to my invention, rosin oil may be produced suitable for use in the commercial arts on a basis of equality with rosin oil produced from gum rosin.

Rosin oil, as is known, is principally used in the manufacture of axle greases and cup greases of all kinds for machinery and, as heretofore used, has been produced by the destructive distillation of rosin, which in the case of wood rosin is productive of a rosin oil of poor quality.

As a result of my investigation I have found that the kidney fraction obtained from the destructive distillation of wood rosin, (i.e. on heating up to as high as say 400° C.) and which constitutes the valuable constituents of rosin oil, is generally of poor quality due to the presence of various impurities, as decomposition products of the rosin. The impurities render wood rosin oil of inferior odor and of poor quality.

Now, in accordance with the method for the production of rosin oil in accordance with my invention, I subject rosin to a preliminary heat treatment in the presence of, or mixed with a boron compound, before subjecting the rosin to destructive distillation.

The boron compound will react with certain impurities of the rosin forming compounds which are of high boiling point and do not go over with the kidney fraction, which in consequence is substantially the same in properties as gum rosin oil.

In carrying out the method in accordance with my invention, I may use boron compounds which will form rosin oil upon heating with the abietic acid of rosin, as, for example, boric anhydride, boric acid, sodium tetraborate, borax, calcium tetraborate, etc.

By way of illustration of the practical adaptation of the method embodying my invention, for example, wood rosin suitably broken up is charged into a still, suitably connected to a condenser, and subjected to heat. As the rosin is charged into the still boric acid, or boric anhydride, is added in amount preferably within about the range .05%–1.0%, more or less, depending upon the degree of purity desired in the rosin oil. The boric acid or boric anhydride is desirably added in portions with the rosin so that it will be dispersed through the charge of rosin as far as possible.

After charging, the rosin and boric acid, or boric anhydride, are subjected to heat sufficient to drive off moisture present in the rosin and water released from the boric acid, if such is used, the still being left open. When the moisture has been driven off, the still is sealed and the temperature raised to within about the range 215° C.–250° C. and maintained for a period of from one hour to three hours, for example, say about two hours. Heating at the temperature indicated will cause the boric acid or boric anhydride to react with certain impurities of the rosin to produce the high boiling compounds above referred to.

After the heating period the temperature is raised to the distillation point of the rosin, say a temperature within the range 300° C.–400° C. and the rosin destructively distilled in the usual manner for the production of rosin oil.

The kidney fraction produced from wood rosin according to the method embodying my invention, will be found to be of a quality substantially the same as that of rosin oil produced from gum rosin, while the bloom oil will be about the same quality as that prepared by ordinary destructive distillation.

It will be understood that in carrying out the method embodying my invention there is not required any particular form of apparatus and that I may vary the time of treatment, distill under vacuum, or under normal or increased pressure, and with or without steam, as conditions may warrant, without departing from my invention.

Having now fully described my invention, what I claim and desire to protect by Letters Patent is:

1. The step in the method of producing rosin oil which includes heating rosin in the presence of a boron compound.

2. The step in the method of producing rosin oil which includes heating wood rosin in the presence of a boron compound.

3. The step in the method of producing rosin oil which includes heating rosin in the presence of boric anhydride.

4. The step in the method of producing rosin oil which includes heating wood rosin in the presence of boric anhydride.

5. The step in the method of producing rosin oil which includes heating rosin in the presence of boric acid.

6. The step in the method of producing rosin oil which includes heating wood rosin in the presence of boric acid.

7. The method of producing rosin oil which includes heating rosin in the presence of a boron compound and then subjecting the rosin to destructive distillation.

8. The method of producing rosin oil which includes heating wood rosin in the presence of a boron compound and then subjecting the rosin to destructive distillation.

9. The method of producing rosin oil which includes heating wood rosin in the presence of about .05%–1.0% of a boron compound and then subjecting the rosin to destructive distillation.

10. The method of producing rosin oil which includes heating wood rosin to a temperature of about 215° C.–250° C. in the presence of .05%–1.0% of a boron compound and then subjecting the rosin to destructive distillation.

11. The method of producing rosin oil which includes heating wood rosin in the presence of about .05%–1.0% of boric acid and then subjecting the rosin to destructive distillation.

12. The method of producing rosin oil which includes heating wood rosin to a temperature of about 215° C.–250° C. in the presence of .05%–1.0% of boric acid and then subjecting the rosin to destructive distillation.

13. The method of producing rosin oil which includes heating rosin to a temperature of about 215° C.–250° C. in the presence of .05%–1.0% of a boron compound and then subjecting the rosin to destructive distillation.

14. The method of producing rosin oil which includes heating rosin in the presence of boric acid to a temperature sufficient to drive off moisture present in the rosin and water liberated from the boric acid, raising the temperature to about 215° C.–250° C. while avoiding substantial distillation of the rosin and finally subjecting the rosin to destructive distillation.

15. The method of producing rosin oil which includes heating wood rosin with about .05%–1.0% of boric acid to a temperature sufficient to drive off moisture present in the rosin and water liberated from the boric acid, raising the temperature to about 215° C.–250° C. while avoiding substantial distillation of the rosin and finally subjecting the rosin to destructive distillation.

16. The method of producing rosin oil which includes heating rosin in the presence of a boron compound and then subjecting the rosin to destructive distillation under reduced pressure.

17. The method of producing rosin oil which includes heating wood rosin in the presence of a boron compound and then subjecting the rosin to destructive distillation under reduced pressure.

18. The method of producing rosin oil which includes heating wood rosin in the presence of about .05%–1.0% of a boron compound and then subjecting the rosin to destructive distillation under reduced pressure.

In testimony of which invention, I have hereunto set my hand, at Kenvil, N. J., on this 26th day of December, 1928.

JOSEPH N. BORGLIN.